E. E. CULBERTSON
UNIVERSAL JOINT.
APPLICATION FILED NOV. 26, 1917.
1,285,053.
Patented Nov. 19, 1918.
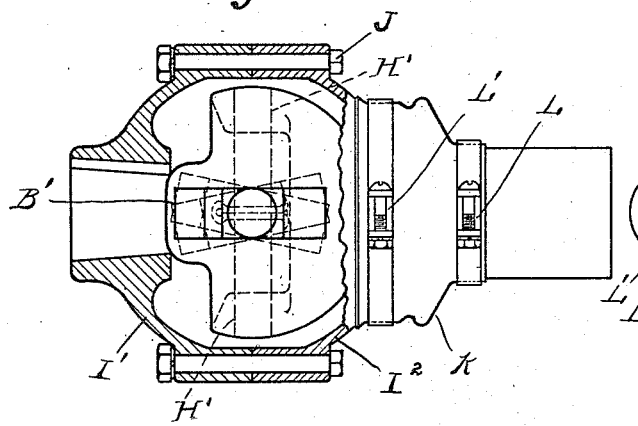
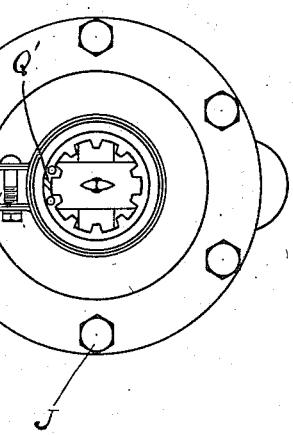
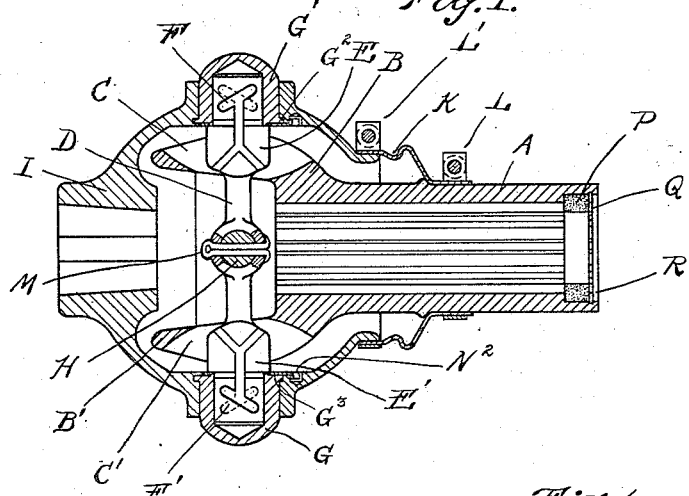
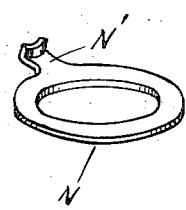
INVENTOR
E. Estay Culbertson
BY
Whittemore Hulbert & Whittemore
ATTORNEYS

UNITED STATES PATENT OFFICE.

E. ESTAY CULBERTSON, OF DETROIT, MICHIGAN, ASSIGNOR OF ONE-FIFTIETH TO CHARLES J. A. WARDWELL, OF DETROIT, MICHIGAN.

UNIVERSAL JOINT.

1,285,053.  Specification of Letters Patent.  Patented Nov. 19, 1918.

Application filed November 26, 1917. Serial No. 203,888.

*To all whom it may concern:*

Be it known that I, E. ESTAY CULBERTSON, a citizen of the United States of America, residing at Detroit, in the county of Wayne and State of Michigan, have invented certain new and useful Improvements in Universal Joints, of which the following is a specification, reference being had therein to the accompanying drawings.

The invention relates to universal joints, and comprises the novel construction as hereinafter set forth.

In the drawings:

Figure 1 is a longitudinal section through the joint;

Fig. 2 is a sectional elevation viewed at right angles to Fig. 1;

Fig. 3 is an end elevation; and

Fig. 4 is a perspective view of the retainer.

A is one of the members of the joint, which has a hollow shank broached or otherwise machined to slidably engage the spline shaft (not shown). This member is further provided with a hollow substantially spherical head B, having on diametrically opposite sides thereof the slots C and C' with parallel side walls. D is a pin insertible through the slots C C' and extending diametrically across the hollow spherical head B. This pin is provided with portions E and E' having parallel faces fitting against the parallel walls of the slots C and C'. Beyond the portions E and E' are cylindrical journal portions F and F' which are engageable with bearing bushings G and G'. At its center the pin D is transversely bored to engage a cross pin H, which also engages alined apertures in the opposite walls of the hollow head B and is insertible through one of said apertures into engagement with the pin D. I is the coöperating member of the joint formed in two sections I' and I² which join each other in the plane of the axis of the pin D and are fashioned to embrace and clamp the bushings G and G'. These sections are secured to each other by suitable means, such as the bolts J, and together embrace the spherical head B of the member A with sufficient clearance to avoid contact therewith in all positions of relative angular adjustment of the two members. The clearance space necessary to permit of such angular adjustment is covered by a flexible boot K which is secured by clamps L and L' to the members A and I².

In assembling the joint the pin D is first passed through the slots C and C' into a position where its transverse bore registers with those in the head B; the pin H is then inserted through the alined bores and is locked to the pin D by a cotter-pin M or other suitable locking means. The bushings G and G' may then be placed upon the journal portions F and F' of the pin D, after which the two sections I' and I² of the member I are clamped together and around the bushings G and G'. When thus assembled perfect freedom for angular adjustment is provided, while at the same time the torque is transmitted from the member A to the member I through the medium of the cross-pin D. The torque stresses are carried into the pin D through the parallel walls of the slots C and C' and from the journals F and F' into the bushings G and G', which are clamped to the member I. The members A and I are not, however, directly in contact with each other, which avoids the machining of spherical surfaces and greatly lessens and simplifies the labor of construction.

To facilitate assembling the bushings G and G' are preferably secured to the member I² in advance of the engagement of said member with the member I'. For this purpose the bushings are circumferentially flanged at G² to engage grooves in the bearings therefor in the members I' and I². They are further provided with portions G³ which engage snap rings N. The latter are formed to fit between the bushings and the portions E and E' of the pin D and are provided with prongs N' which snap into recesses N² in the member I². The arrangement is such that the member I² will be held by these retainers in assembled relation to the member A, and in fact all of the members are secured to this member A with the exception of the member I' which is mounted upon the drive shaft. Thus to engage the drive and driven shafts it is only necessary to register the members I' and I² and secure the same by the bolts J. The construction is therefore one which is not only cheaply manufactured but is easily assembled.

To retain the lubricant the packing washer P is placed in a groove in the shank of the member A to surround the shaft beyond the splines. This packing is retained by a spring washer Q which is split at Q' to permit of contracting and is engageable when released with a groove R in the shank A.

It will be observed that the slots C and C' in the hollow head B are not open but are bridged across at their outer ends by the portion B'. This greatly adds to the strength of the member B in resisting torque stresses and dispenses with the necessity of a surrounding member in contact therewith to form a reinforcement therefor.

What I claim as my invention is:

1. A universal joint, comprising a member having a hollow head and slots parallel to the axis thereof on diametrically opposite sides of said head, a pin insertible through said slots having parallel bearing portions for engaging the same and cylindrical journal portions beyond said bearing portions, a transversely extending pin engaging said first-mentioned pin at the center of said hollow head and also engaging alined bearings in said head, and a coöperating member for embracing the journals on said pin, said member being hollow to receive the hollow head of the first-mentioned member and providing clearance for the movement thereof.

2. A universal joint, comprising a member having a hollow substantially spherical head and parallel slots on diametrically opposite sides thereof, a pin insertible through said slots having parallel bearing portions for engaging the slots and journal portions beyond said parallel portions, a pin extending transversely through said head and first-mentioned pin engaging alined apertures therein, bushings engaging the journal bearings of said pin, and a coöperating member formed in complementary hollow sections embracing said bushings and clamping the same, said hollow sections providing clearance for said spherical head.

3. In a universal joint, the combination with a member having a hollow substantially spherical head with parallel slots on diametrically opposite sides thereof, of a pin insertible through said slots having parallel portions for engaging the slots, a central eye portion and journal portions projecting beyond said parallel portions, a transversely-extending pin engaging said central eye portion and alined apertures in said hollow head, bushings engaging said journal portions, a hollow segmental spherical member engaging said bushings and secured thereto, providing clearance between the same and the hollow head of the first-mentioned member, and a complementary hollow segmental spherical member clamped to the first-mentioned hollow segmental spherical member.

4. A universal joint, comprising a member having a projecting hollow shank and a hollow spherical head with parallel slots therein on diametrically opposite sides thereof, a pin insertible through said slots and having parallel portions for engaging the same, an eye portion at the center and journal portions projecting beyond said parallel portions, a transversely-extending pin passing through the eye portion of said first-mentioned pin and alined apertures in said hollow spherical head, a locking pin connecting the engaging portions of said first-mentioned pins, bushings engaging said journal portions, a hollow spherical member formed in complementary sections embracing said spherical head with a clearance therebetween and also engaging said bushings, and means for clamping said complementary sections together.

5. In a universal joint, the combination with a hollow broached shank for engaging the spline shaft, of a lubricant container comprising a packing engaging a groove in said shank, and a spring washer for retaining said packing contractible for insertion in said hollow shank and engaging when expanded a retaining groove in said shank.

6. A universal joint, comprising a member fitting a hollow substantially spherical head with parallel slots in diametrically opposite sides thereof and with integral tie portions at opposite ends of said slots, a pin insertible through said slots having parallel bearing portions for engaging the slots and journal portions beyond said parallel portions, a pin extending transversely through said head and first-mentioned pin engaging alined apertures therein, bushings engaging the journal bearings of said pin and a hollow coöperating member for engaging said bushings.

7. A universal joint, comprising a member having a hollow substantially spherical head with parallel slots in diametrically opposite sides thereof, a pin insertible through said slots having bearing portions for engaging the slots and journal portions beyond said bearing portions, a pin extending transversely through said first-mentioned pin and head, engaging alined apertures therein, bushings engaging the journal portions of said pin, a hollow segmental spherical member engaging said bushings, snap rings connecting said bushings to said segmental spherical member, and a complementary hollow segmental spherical member secured to the first-mentioned hollow segmental spherical member.

8. A universal joint, comprising a member having a hollow substantially spherical head with parallel slots in diametrically opposite sides thereof, a pin insertible through said slots having bearing portions for engaging the same, and journal portions beyond said bearing portions, a pin extending transversely through said first-mentioned pin and head, engaging alined apertures therein, bushings engaging the journal portions of said pin, a hollow segmental spherical member engaging said bushings, means for connecting said bushings to said segmental spherical member, and a complementary hollow spherical member secured to the first-mentioned hollow segmental spherical member.

9. A universal joint, comprising a member having a hollow head with parallel slots in diametrically opposite sides thereof, a pin insertible through said slots having bearing portions for engaging the same and journal portions beyond said bearing portions, a pin extending transversely through said first-mentioned pin and head, engaging alined apertures therein, bushings engaging the journal portions of said pin, a hollow member engaging said bushings, means for connecting said bushings to said hollow member, and a complementary hollow member secured to the first-mentioned hollow member.

In testimony whereof I affix my signature.

E. ESTAY CULBERTSON.